United States Patent
Meano et al.

(10) Patent No.: US 8,337,344 B2
(45) Date of Patent: Dec. 25, 2012

(54) ASYMETRIC DAMPING BELT TENSIONER

(75) Inventors: Maria Cesare Meano, Turin (IT); Renzo Gozzano, Salerano Canavese (IT)

(73) Assignee: Dayco Europe S.R.L., Chieti (IT)

( * ) Notice: Subject to any disclaimer, the term of this patent is extended or adjusted under 35 U.S.C. 154(b) by 705 days.

(21) Appl. No.: 11/993,385

(22) PCT Filed: Jun. 20, 2005

(86) PCT No.: PCT/IT2005/000354
§ 371 (c)(1),
(2), (4) Date: Feb. 25, 2009

(87) PCT Pub. No.: WO2006/137086
PCT Pub. Date: Dec. 28, 2006

(65) Prior Publication Data
US 2010/0222169 A1    Sep. 2, 2010

(51) Int. Cl.
*F16H 7/12*    (2006.01)
(52) U.S. Cl. ........................................ 474/109; 474/135
(58) Field of Classification Search .................. 474/101, 474/109, 111.112, 133, 135
See application file for complete search history.

(56) References Cited

U.S. PATENT DOCUMENTS

| 5,370,585 | A | * | 12/1994 | Thomey et al. | 474/112 |
| 5,632,697 | A | * | 5/1997 | Serkh | 474/109 |
| 2003/0216204 | A1 | * | 11/2003 | Serkh et al. | 474/135 |

FOREIGN PATENT DOCUMENTS

| EP | 0780597 A | 6/1997 |
| WO | WO 01/40682 A | 6/2001 |
| WO | WO 02/068841 A | 9/2002 |
| WO | WO 02/095262 A | 11/2002 |

OTHER PUBLICATIONS

International Search Report and Written Opinion prepared by the European Patent Office on Mar. 30, 2006, for PCT/IT2005/000354; Applicant, Dayco Europe S.R.L. Con Unico.
International Preliminary Report on Patentability (Chapter II of the Patent Cooperation Treaty) prepared by the European Patent Office on Sep. 21, 2007, for PCT/IT2005/000354; Applicant, Dayco Europe S.R.L. Con Unico.

* cited by examiner

*Primary Examiner* — William E Dondero
(74) *Attorney, Agent, or Firm* — Sheridan Ross P.C.

(57) ABSTRACT

A tensioner for a belt drive, comprising: a base carrying a pin defining an axis; a tensioning arm, which can rotate about the pin and supports an idle pulley; and a damping element, which is constrained to a hinge point eccentric with respect to the axis and is carried by one between the base and the tensioning arm so as to co-operate with a friction surface carried by the other between the base and the tensioning arm. The belt tensioner further comprises a resilient element having a first end portion connected in a single point to the damping element and a second end portion connected to the other between the base and the tensioning arm to cause a rotation of the damping element about the hinge point against the friction surface.

8 Claims, 3 Drawing Sheets

1

ASYMETRIC DAMPING BELT TENSIONER

CROSS REFERENCE TO RELATED APPLICATION

This application is a national stage application under 35 U.S.C. 371 of PCT Application No. PCT/IT2005/000354 having an international filing date of Jun. 20, 2005, which designated the United States, the entire disclosure of which is hereby incorporated herein by reference.

TECHNICAL FIELD

The present invention relates to an asymmetric-damping tensioner for a belt, in particular for a belt of an accessory drive of a motor vehicle.

BACKGROUND ART

The U.S. Pat. No. B1 6,609,988 illustrates an asymmetric-damping belt tensioner comprising: a cup-shaped body defining a supporting pin; a tensioning arm connected to the supporting pin so that it can rotate; a pulley mounted on the tensioning arm so that it can rotate; and a helical thrust spring arranged concentrically about the supporting pin within the cup-shaped body. The known belt tensioner further comprises an annular friction element actuated by the thrust spring and driven by the tensioning arm via a multiplicity of stop elements carried by the tensioning arm and eccentric with respect to an axis of rotation of the tensioning arm.

In particular, the thrust spring comprises a first end portion rigidly connected to the cup-shaped body and a second end portion bent in the direction of the supporting pin and connected to the friction element in two contrast points so as to exert a torque on the friction element itself and pre-load the friction element against an internal cylindrical wall of the cup-shaped body.

Furthermore, the thrust spring exerts a pressure in the axial direction against the friction element, holding it against the tensioning arm.

During operation, the thrust spring is simultaneously subjected to variable torsional loads due to the angular movement of the tensioning arm, an axial load necessary to maintain the friction element axially in position against the tensioning arm, and a bending moment, localized on the second end portion, for pre-loading the friction element against the cup-shaped body.

Consequently, the thrust spring must have a structure dedicated to the asymmetric-damping application. In addition, design of the spring is critical, and the tolerances that can be obtained in production and in assembly can jeopardize the reliability of the tensioner. The friction element is likewise complex and costly to produce.

DISCLOSURE OF INVENTION

The aim of the present invention is to provide an asymmetric-damping belt tensioner that is free from the drawbacks referred to above.

The aim of the present invention is achieved via an asymmetric-damping belt tensioner as claimed.

BRIEF DESCRIPTION OF THE DRAWINGS

For a better understanding of the present invention, a preferred embodiment is now described, purely by way of non-limiting example, with reference to the attached plate of drawings, wherein.

BEST MODE FOR CARRYING OUT THE INVENTION

Figure 1:
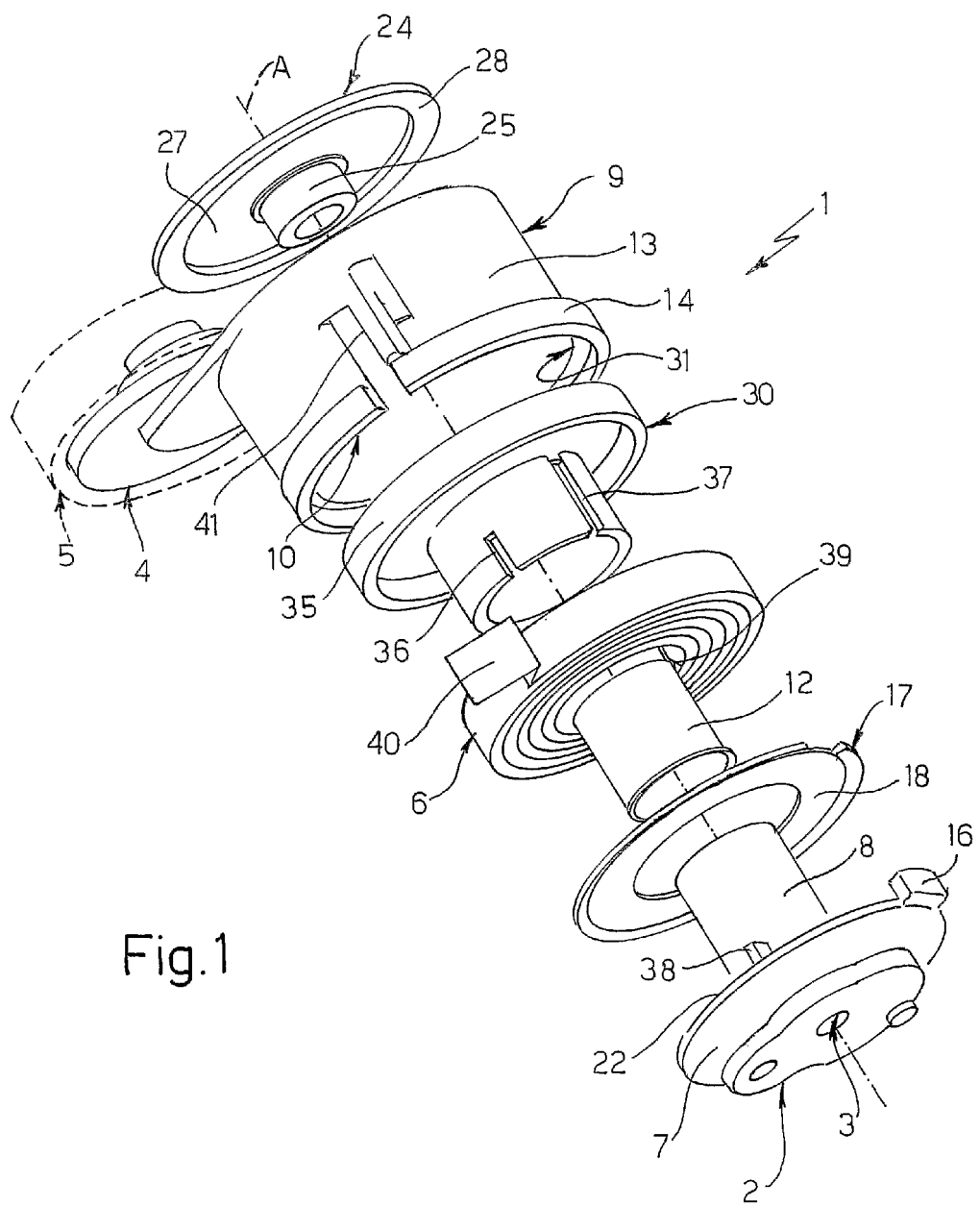
FIG. 1 is an exploded perspective view of a belt tensioner according to the present invention.

FIG. 1 represents a belt tensioner 1 comprising: a base 2 defining a through hole 3 for fixing of the belt tensioner; a tensioning arm 4 rotatably connected to the base 2 and supporting in cantilever way an idle pulley 5 adapted to co-operate with a belt of a belt drive; and a spiral spring 6 applying an actuating torque on the tensioning arm 4 and having a rectangular cross section.

In particular, the base 2 integrally comprises a plane circular plate 7 and a supporting pin 8 radially supporting tensioning arm 4 and having an axis A perpendicular to the circular plate 7.

The tensioning arm 4 integrally comprises, at an opposite end with respect to the pulley 5, a cup-shaped body 9 defining a cavity 10, and a tubular element 11 concentric with the cup-shaped body 9. The tubular element 11 is internal to the cavity 10 and couples in a rotatable way to the supporting pin 8 by means of a bushing 12 made of metal material coated with anti-friction material.

Figure 2:
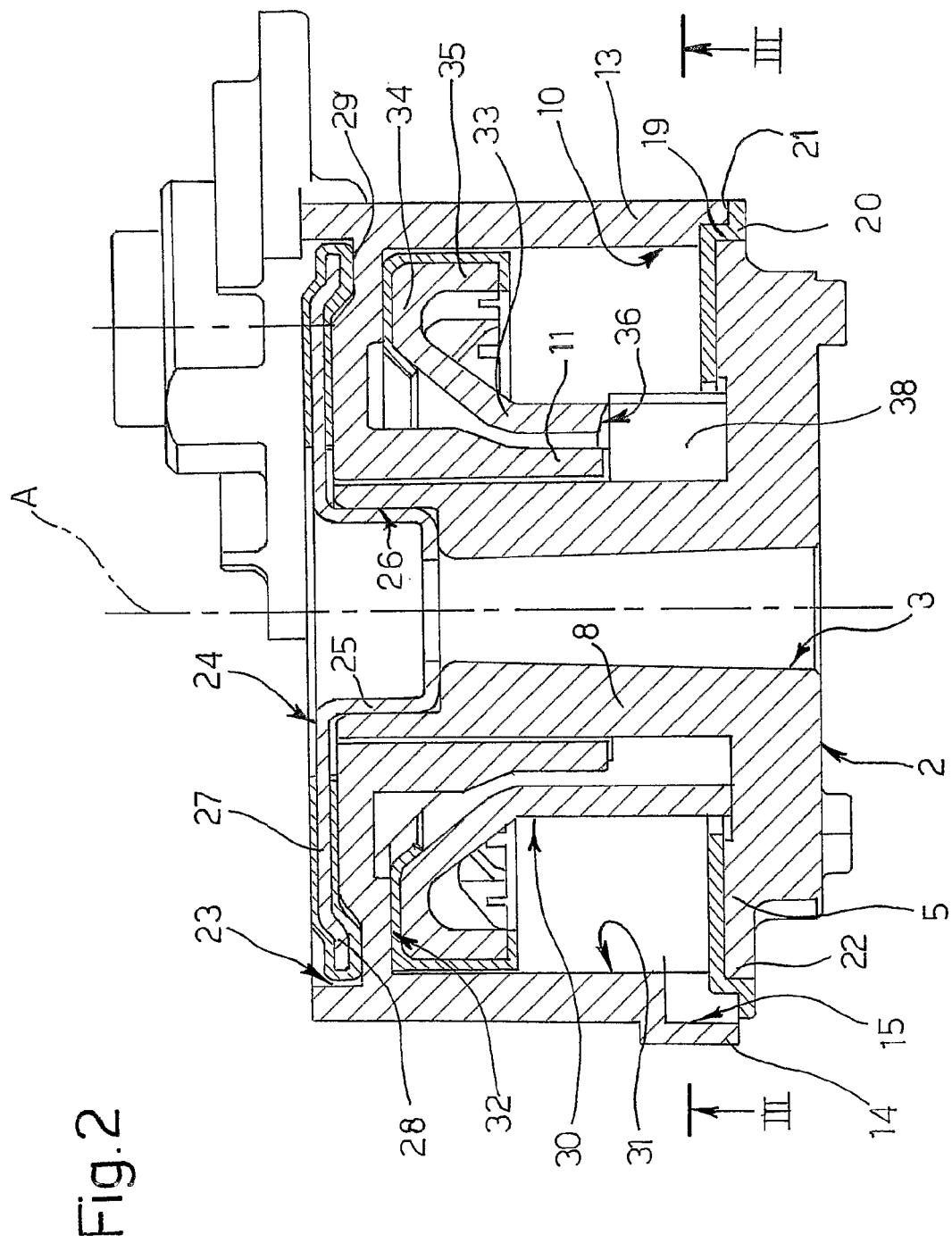
FIG. 2 is a longitudinal section according to a plane designated by II-II in FIG. 1, in which some items have been removed for reasons of clarity.

The cup-shaped body 9 comprises a cylindrical side wall 13 (FIG. 2), which has, along an axial direction, an end edge 14, which radially faces the circular plate 7 and defines a groove 15 shaped like an arc of circumference for housing a contrast element 16 defining two stop end positions of the tensioning arm 4.

The end edge 14 is moreover coupled to an annular gasket 17 made of anti-friction material, which integrally comprises: a plane layer 18 resting on the circular plate 7; a rim 19 perpendicular to the plane layer 18; a radial edge 20 coming out from the rim 19 in a direction parallel to that of the plane layer 18 so as to define an S-shaped radial profile (FIG. 2); and a continuous ribbing 21 coming axially out from the radial edge 20.

The rim 19 is radially coupled both on peripheral sides 22 of the circular plate 7 and on the end edge 14 that defines in a complementary way the S-shaped profile of the gasket 17 and axially co-operates on the radial edge 20 by housing the ribbing 21 in a corresponding groove.

On the axially opposite side with respect to the end edge 14, the cup-shaped body 9 has a concave portion 23 housing a clamping disk 24 connected coaxially to the supporting pin 8 in a rigid way by means of a screw (not illustrated) housed in turn in the through hole 3.

In particular, the clamping disk 24 comprises: a hollow centring element 25, radially coupled within a diametrally enlarged portion 26 of the through hole 3; a plane portion 27; and a peripheral lip 28 projecting axially on the same side of the centring element 25 with respect to the plane portion 27. The plane portion 27 and the peripheral edge 28 are moreover coated with a layer of anti-friction material, which co-operates directly with a surface of the concave portion 23 and defines a ribbing 29 similar to the ribbing 21 and set at a radial height equal to that of the peripheral lip 28.

Within the cup-shaped body 9, the cavity 10 houses the spiral spring 6, which rests on the plane layer 18, and an axisymmetrical damping element 30, which co-operates by friction with an internal surface 31 of the side wall 13 and with a plane surface 32 that is perpendicular to the internal surface 31 and delimits the concave portion 23 inside the cavity 10.

In particular, the damping element 30 houses with radial play the tubular element 11 of the tensioning arm 4 and comprises a funnel-shaped element 33, a plane friction end wall 34 perpendicular to the funnel-shaped element 33, and a cylindrical friction wall 35 coming out perpendicularly from the radial periphery of the plane friction wall 34. For example, the damping element 30 is made of metal material, and a polymeric material is subsequently co-moulded on the walls 34 and 35.

Figure 3:
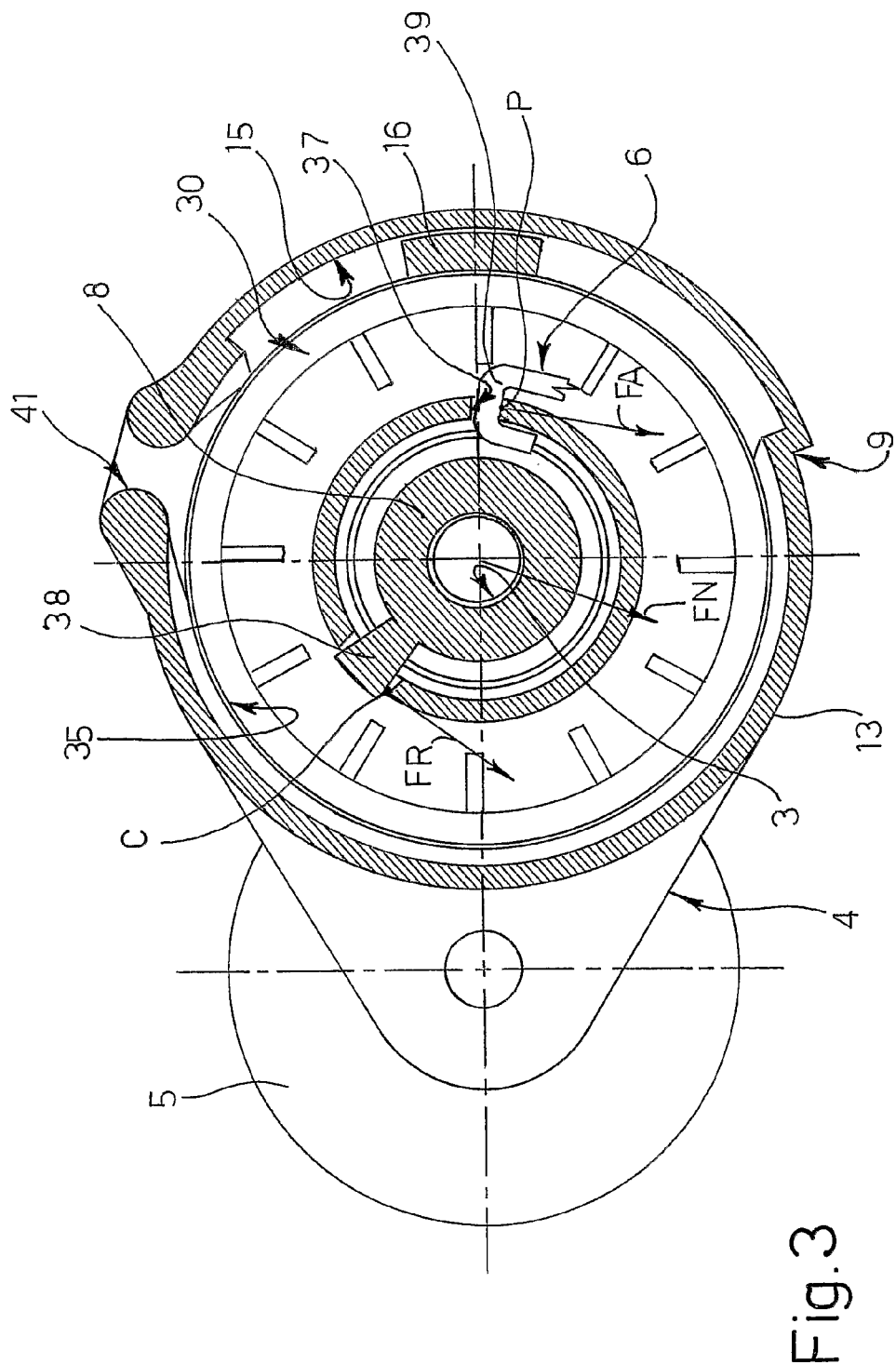
FIG. 3 is a radial cross section according to the line of FIG. 2, in which some items have been removed for reasons of clarity.

Furthermore, the funnel-shaped element 33 carries a through longitudinal open groove 36 and a fixing opening 37. The open groove 36 houses with play stop element 38 radially coming out from the supporting pin 8, whilst the fixing opening 37 defines a single point of connection P with a first hook-shaped end portion 39 of the spiral spring 6 (FIG. 3). The spiral spring 6 further comprises a second end portion 40 opposite to the first end portion and connected to an opening 41 of the side wall 13 of the cup-shaped body 9.

Operation of the belt tensioner 1 is described in what follows.

The damping element 30 is housed with radial play within the cavity 10 of the cup-shaped body 9 and is guided by the plane surface 32 so as to rotate about the arrest element 38, which defines a hinge point C that is eccentric with respect to the axis A. The spiral spring 6 exerts an actuating force FA, which is applied in the point of connection P on the fixing opening 37 and is designed to cause a rotation of the damping element 30 about the hinge point C against the internal surface 31. The damping element 30 is then pressed against the internal surface 31 by a normal force FN defined by the balance of the force FA and of the constraint reactions, i.e., by the arrest element 38, the circular plate 7 and the surfaces 31, 32.

In particular, considering a radial direction with respect to the axis A, the actuating force FA generates, for equilibrium to rotation about the axis A, a force of reaction FR, which is symmetrical to FA with respect to the axis A and is applied in an area of contact with the arrest element 38.

The action of FR and FA generates a normal force FN acting on the internal surface 31 and a turning over moment, which tends to compress the damping element 30 against the plane surface 32.

Considering an axial direction, the points of application of FA and FR, i.e., the respective midpoints of the open groove and of the fixing opening 37, are at different heights, thus generating a second turning over moment that tends to compress the damping element 30 against the plane surface 32.

During operation, not considering the wear of the friction walls 34, 35, the damping element preserves the position of operation described previously thanks to the action of the spiral spring 6. Consequently, the directions of the acting forces remain unchanged, and instead their modulus changes accordingly as the tension of the spring increases or decreases.

In particular, following upon tensioning of the spiral spring 6, FN tends to increase, thus increasing the friction and enabling limitation of the range of movement of the tensioning arm 4 upon any sharp increase in the tension of the belt.

Likewise, when the spiral spring 6 unloads, FN tends to decrease thus enabling the tensioning arm 4 to recover with minimal delays any increase in the slack of the belt.

The advantages of the present belt tensioner are outlined in what follows.

The fact that the spring is constrained to a single point of the damping element 30 corresponding to the fixing opening 37 enables loading of the spring in a uniform way preventing some areas from being subjected to additional loads, for example bending loads, and thus increasing the reliability. In addition, in traditional belt tensioners the springs are constrained at one point to the arm and at the other to the base, and it is thus possible to use a spring similar to that used for a traditional belt tensioner, it being possible to exploit the advantages of large-scale production and without moreover requiring supplementary processes necessary for connection to the known damping device.

The fact that the damping element 30 is subjected also to a turning over moment directed radially with respect to the axis A enables also the use of the plane surface 32 to increase the damping torque, should high values of damping be necessary given the same stiffness of the spiral spring 6.

Furthermore, it is simple and inexpensive to vary the relative position, whether radial or axial, of the open groove 36 and of the fixing opening 37, and hence of the damping characteristics, to adapt to the loads of different types of drives maintaining the overall configuration substantially unchanged.

In addition, the tensioner 1 is provided with labyrinth seals defined by the ribbings 21 and 29 to prevent contamination from outside.

Finally, it is clear that modifications and variations can be made to the tensioner 1 described and illustrated herein without thereby departing from the scope of the present invention, as defined in the annexed claims.

In particular, a dual configuration may be envisaged, in which the damping element co-operates with a side wall integral to the base 2 and is connected to an arrest element carried by the tensioning arm.

The invention claimed is:

1. A tensioner for a belt drive, comprising:
a base carrying a pin defining an axis;
a tensioning arm rotatable about said pin;
an idle pulley supported by said tensioning arm;
a damping element constrained to a hinge point positioned eccentric with respect to said axis and carried by one between said base and said tensioning arm to co-operate with a first friction surface carried by the other between said base and said tensioning arm;
a resilient element having a first end portion connected in a single point to said damping element via a hook, and a second end portion connected to the other between said base and said tensioning arm to cause a rotation of said damping element about said hinge point against said first friction surface;
a second friction surface defined by the other between said base and said tensioning arm, and said second friction surface oriented transverse with respect to said first friction surface and cooperating with said damping element, wherein a turning over moment compresses the damping element against said second friction surface in a direction substantially parallel to said axis;
and wherein said damping element houses said pin with radial play.

2. The belt tensioner according to claim 1, wherein said single point and said hinge point are axially set apart for generating the turning over moment about a direction substantially perpendicular to said axis.

3. The belt tensioner according to claim 1, wherein said tensioning comprises a cup-shaped body defining a cavity housing said damping element and said resilient element.

4. The belt tensioner according to claim 3, wherein the belt tensioner further comprises a fixing element, rigidly connected to said pin for axially constraining an actuation arm, said element comprising labyrinth-seal means cooperating with said arm for preventing any contamination of said cavity.

5. The belt tensioner according to claim 1, wherein said resilient element is a spiral spring.

6. The belt tensioner according to claim 1, wherein said hinge point is defined by a single stop element.

7. The belt tensioner according to claim 1, wherein said damping element is constrained to said hinge point on said base and in that said friction surface is carried by said tensioning arm.

8. The belt tensioner according to claim 7, wherein said hinge point is defined by a stop element, which comes out radially from said pin and is housed in a seat of said damping element.

* * * * *

UNITED STATES PATENT AND TRADEMARK OFFICE
CERTIFICATE OF CORRECTION

PATENT NO. : 8,337,344 B2
APPLICATION NO. : 11/993385
DATED : December 25, 2012
INVENTOR(S) : Meano et al.

It is certified that error appears in the above-identified patent and that said Letters Patent is hereby corrected as shown below:

At column 4, line 66 of claim 3, please add the word "arm". Claim 3 should read:
"The belt tensioner according to claim 1, wherein said tensioning arm comprises a cup-shaped body defining a cavity housing said damping element and said resilient element."

Signed and Sealed this
Fifth Day of March, 2013

Teresa Stanek Rea
*Acting Director of the United States Patent and Trademark Office*